UNITED STATES PATENT OFFICE.

CHRISTIAN HANSEN, OF WIESDORF, GERMANY, ASSIGNOR TO FARBENFABRIKEN VORM. FRIEDR. BAYER & CO., OF ELBERFELD, GERMANY, A CORPORATION OF GERMANY.

PROCESS OF PRODUCING SULFUR AND SULFATES FROM SULFITES.

1,101,740. Specification of Letters Patent. Patented June 30, 1914.

No Drawing. Application filed January 17, 1913. Serial No. 742,679.

*To all whom it may concern:*

Be it known that I, CHRISTIAN HANSEN, doctor of philosophy, chemist, citizen of the German Empire, residing at Wiesdorf, near Cologne, Kingdom of Prussia, Germany, have invented new and useful Improvements in Processes of Producing Sulfur and Sulfates from Sulfites, of which the following is a specification.

I have found that sulfur and sulfates can be obtained in a very simple manner and without danger of explosion by heating solutions of mixtures of acid and neutral sulfites containing such quantities of the said components that the reaction can proceed *e. g.* according to the following equation:

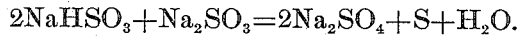
$$2NaHSO_3 + Na_2SO_3 = 2Na_2SO_4 + S + H_2O.$$

In order to illustrate the new process more fully the following examples are given, the parts being by weight:—

Example A: 150 parts of bisulfite of ammonia and 90 parts of sulfite of ammonia are dissolved in 200 parts of water and the reaction mass is then heated under pressure to about 150° C. while continuously stirring. The conversion will be finished after 4–5 hours.

Example B: 150 parts of bisulfite of sodium and 90 parts of sulfite of sodium are dissolved in 200 parts of water and the reaction mass is then heated under pressure to about 160–170° C. while continuously stirring. The conversion will be finished after 4–5 hours. Other sulfites or bisulfites may be used.

I claim:—

1. The process for producing sulfur and sulfates, which comprises heating under pressure solutions of mixtures of acid and neutral salts of sulfurous acid, substantially as described.

2. The process for producing sulfur and sulfates, which comprises heating under pressure solutions of a mixture of 2 molecules of a bisulfite with one molecule of a sulfite, substantially as described.

3. The process for producing sulfur and sodium sulfate, which comprises heating under pressure solutions of a mixture of acid and neutral sodium salts of sulfurous acid, substantially as described.

4. The process for producing sulfur and sodium sulfate, which comprises heating under pressure solutions of a mixture of 2 molecules of bisulfite of sodium with one molecule of sulfite of sodium, substantially as described.

5. The process of producing sulfur and sulfates which comprises heating solutions of a mixture of 2 molecules of a bisulfite with one molecule of a sulfite under pressure and with continuous stirring.

6. The process for producing sulfur and sodium sulfate, which comprises heating a solution of a mixture of about 150 parts of bisulfite of sodium and 90 parts of sulfite of sodium in about 200 parts of water under pressure to a temperature of about 160–170° C.

In testimony whereof I have hereunto set my hand in the presence of two subscribing witnesses.

CHRISTIAN HANSEN. [L. S.]

Witnesses:
ALBERT NUFER,
DORA NUFER.